United States Patent [19]
Evans

[11] Patent Number: 4,894,521
[45] Date of Patent: Jan. 16, 1990

[54] ELECTRIC HEATING ELEMENT FOR FUSING THERMOPLASTIC MATERIALS

[75] Inventor: Harold J. Evans, Perkins, Okla.

[73] Assignee: Central Plastics Company, Shawnee, Okla.

[21] Appl. No.: 273,930

[22] Filed: Nov. 21, 1988

[51] Int. Cl.$^4$ ................................................ H05B 3/58
[52] U.S. Cl. ........................................ 219/535; 219/544; 285/22; 285/286
[58] Field of Search ............... 219/528, 535, 541, 544, 219/551; 338/293, 297, 310; 285/21, 22, 286, 423

[56] References Cited

U.S. PATENT DOCUMENTS

| | | | |
|---|---|---|---|
| 3,987,276 | 10/1976 | Vogelsanger et al. | 219/535 |
| 4,117,311 | 9/1978 | Sturm | 219/544 |
| 4,147,926 | 4/1979 | Stahli | 219/535 |
| 4,349,219 | 9/1982 | Sturm | 285/21 |
| 4,436,987 | 3/1984 | Thalmann | 219/535 |
| 4,436,988 | 3/1984 | Blumenkranz | 219/544 |
| 4,449,038 | 5/1984 | Reich | 219/535 |
| 4,455,482 | 6/1984 | Grandclement | 219/551 |
| 4,486,650 | 12/1984 | Bridgestock et al. | 219/544 |

FOREIGN PATENT DOCUMENTS 1408844 10/1975 United Kingdom .

*Primary Examiner*—Bruce A. Reynolds
*Assistant Examiner*—Leon K. Fuller
*Attorney, Agent, or Firm*—Laney, Dougherty, Hessin & Beavers

[57] ABSTRACT

An electric heating element for electrically fusing thermoplastic materials. The heating element comprises an elongated thermoplastic insulated wire wound in a spiral configuration with adjacent surfaces of the thermoplastic insulation adhered together.

15 Claims, 2 Drawing Sheets

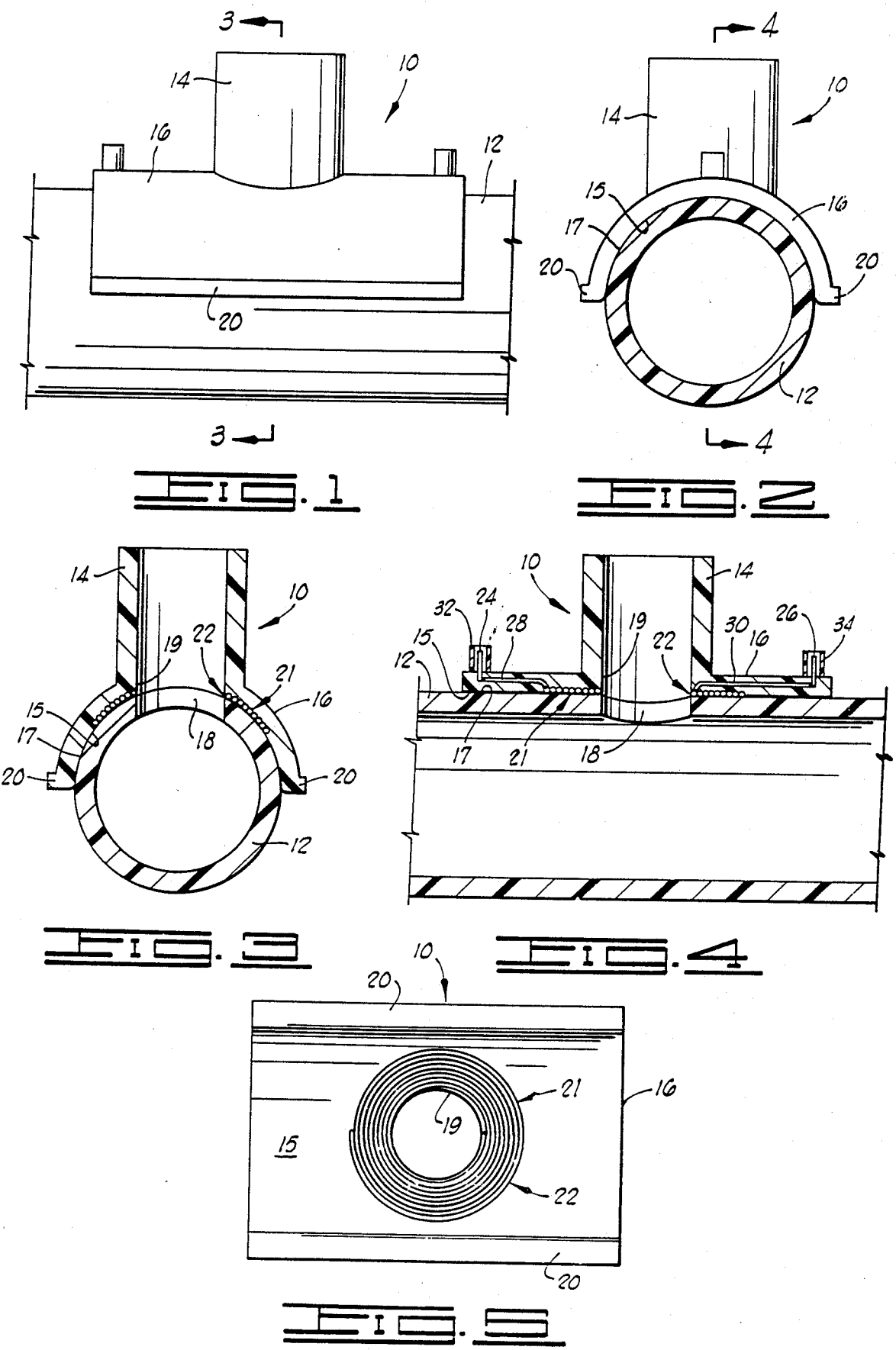

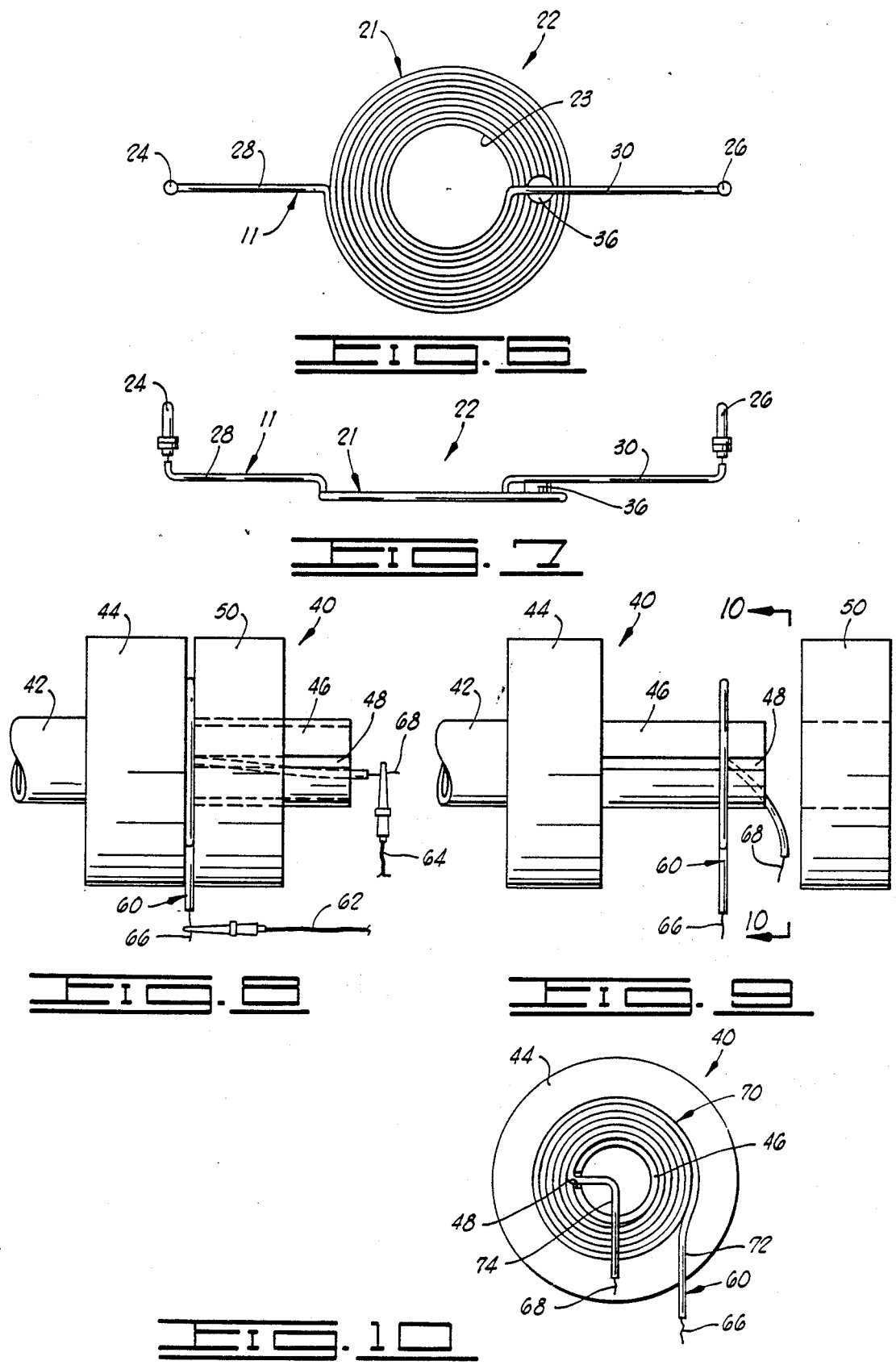

ELECTRIC HEATING ELEMENT FOR FUSING THERMOPLASTIC MATERIALS

BACKGROUND OF THE INVENTION

1. Field of the Invention

The present invention relates to an electric heating element for fusing thermoplastic materials, and more particularly, to an electric heating element of the type used in the electric heat fusion of thermoplastic pipe fittings and the like.

2. Description of the Prior Art

Electric heat weldable fittings formed of thermoplastic material have been developed and used heretofore. Such fittings generally include an electric resistance heating coil or element positioned adjacent the inside surfaces of the fitting which are to be welded to one or more other thermoplastic members such as plastic pipe sections. The electric heating element is usually a coil of wire disposed in the thermoplastic material of the fitting connected to electric contacts which are attached to an outside surface of the fitting. In welding the fitting to a complementary thermoplastic member or members such as one or more pipe sections, the fitting is positioned in contact with the other thermoplastic member or members, a source of electric current is connected to the contacts, and electric current is supplied to the heating element of the fitting. The wire making up the heating element imposes a resistance to the current which causes it as well as the thermoplastic member or members positioned adjacent thereto to be heated whereby the thermoplastic materials of the fitting and adjacent member or members are fused together. Examples of coupling types of electric heat fusable thermoplastic fittings are described in U.S. Pat. Nos. 4,349,219 issued Sept. 14, 1982 and 4,147,926, issued Apr. 3, 1979. A saddle tee type of electric heat fusable thermoplastic fitting is described in U.S. Pat. No. 4,455,482 issued June 19, 1984.

An electric heat fusable thermoplastic fitting of the coupling type generally includes a heating element which is comprised of an elongated wire formed in a helical configuration disposed within the internal cylindrical thermoplastic sides of the fitting. The saddle tee type of electrically fusable thermoplastic fitting has heretofore included a relatively expensive and elaborate heating element comprised of a spirally configured resistance wire disposed in a manufactured thermoplastic plate. That is, as disclosed in U.S. Pat. No. 4,455,482 mentioned above, the heating element has heretofore been produced from a flat annular plate formed of thermoplastic material in which a spiral groove is formed. An electric heating wire is disposed within the groove and held therein by melted portions of the plate formed with a heated tool, or other similar means. In producing a prior art saddle tee fitting, the plate containing the heating wire is placed in a thermoplastic injection mold for forming the fitting and bent to conform with and form a part of the arcuate inside surface of the fitting followed by the injection of thermoplastic material into the mold. The term "saddle tee" is used herein to mean both self-tapping tees of the type described in U.S. Pat. No. 4,455,482 and branch tees which are not self-tapping.

Spirally configured wire heating elements of the type described above, in addition to being used in electric heat fusable saddle tees, have been used in other applications for fusing thermoplastic material such as in the repair of tears or holes in thermoplastic material coverings. In such an application, a heating element is placed between the layer of thermoplastic material to be repaired and a second layer of thermoplastic material placed over the area to be repaired. Upon the application of electric current to the heating element, the layers of thermoplastic material are fused together.

By the present invention, an improved spirally configured wire heating element for electrically fusing thermoplastic materials positioned adjacent thereto is provided. A method of producing the electric heating element and an improved thermoplastic fitting including the heating element are also provided.

SUMMARY OF THE INVENTION

In one aspect, the present invention is directed to an electric heating element for electrically fusing thermoplastic materials positioned adjacent thereto. The heating element is comprised of an elongated thermoplastic insulated wire having a portion thereof wound in a spiral configuration and having adjacent surfaces of the thermoplastic insulation in the spirally configured portion adhered together.

In another aspect of the present invention, an improved thermoplastic fitting adapted to be fusion welded to a complementary thermoplastic member is provided. The thermoplastic fitting includes, as a part thereof, an electric heating element comprised of an elongated thermoplastic insulated wire having a portion thereof wound in a spiral configuration and having adjacent surfaces of the thermoplastic insulation in the spirally configured portion adhered together.

In yet another aspect of the present invention, a method of producing the heating element for fusing thermoplastic materials is provided. The method comprises winding a portion of an elongated thermoplastic insulated wire in a spiral configuration and then briefly heating the insulating thermoplastic material of the wire while maintaining the wire in the spiral configuration whereby adjacent surfaces of the thermoplastic insulation in the spirally configured portion of the wire are fused together.

It is, therefore, a general object of the present invention to provide an improved electric heating element for fusing thermoplastic materials.

A further object of the present invention is the provision of an improved electric heating element for electrically fusing thermplastic materials which is simple and economical Another object of the present invention is the provision of an improved electric fusable thermoplastic fitting including the heating element of the invention.

Yet another object of the present invention is the provision of a method of inexpensively producing the electric heating element of this invention.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side view of a saddle tee thermoplastic fitting of the present invention positioned on a thermoplastic plastic pipe section.

FIG. 2 is an end view of the fitting and pipe section of FIG. 1.

FIG. 3 is a cross-sectional view taken along line 3—3 of FIG. 1.

FIG. 4 is a cross-sectional view taken along line 4—4 of FIG. 2.

FIG. 5 is a bottom view of the saddle tee thermoplastic fitting illustrated in FIGS. 1-4.

FIG. 6 is a top plan view of a heating element of the present invention.

FIG. 7 is a side elevational view of the heating element of FIG. 6.

FIG. 8 is a side elevational view of one form of apparatus for producing the improved heating element of the present invention.

FIG. 9 is a side elevational view of the apparatus of FIG. 8 in a different operational mode.

FIG. 10 is a side view taken along line 10—10 of FIG. 9.

DETAILED DESCRIPTION OF PREFERRED EMBODIMENTS

Referring now to the drawings and particularly to FIGS. 1 through 5, a saddle tee thermoplastic electric heat fusable fitting of the present invention is illustrated and generally designated by the numeral 10. In FIGS. 1-4 the saddle tee 10 is shown positioned on a thermoplastic pipe section 12. The saddle tee 10 is comprised of a lateral pipe stub 14 integrally connected to a saddle 16. The lateral pipe stub 14 is cylindrical in shape and is adapted to be connected to an elongated pipe section by an appropriate coupling or to another thermoplastic fitting. The saddle 16 includes an opening 19 communicating with the interior of the pipe stub 14 and has an arcuate shape which is complementary to the shape of the pipe section 12 to which it is to be fused. That is, as shown in FIGS. 2 and 3, the saddle 16 of the fitting 10 is of a shape whereby the curvature of the inside surface 15 thereof matches the curvature of the external surface 17 of the pipe 12. The sides of the saddle 16 terminate in longitudinal lugs 20 which extend radially outwardly in opposite directions. The lugs 20 can be engaged by a clamping tool (not shown) for rigidly clamping the saddle tee 10 to the pipe section 12.

As shown in FIGS. 3-5, an electric heating element, generally designated by the numeral 22, is molded into the internal surface 15 of the saddle 16 of the fitting 10. The heating element 22 is annular in shape and surrounds the opening 19 in the saddle 16. Electric contacts 24 and 26 (FIG. 4) are attached to the saddle 16 of the fitting 10 whereby they extend upwardly from the external surface thereof. The contacts 24 and 26 are connected to lead wires 28 and 30 of the heating element 22, and cylindrical protectors 32 and 34 are connected to the saddle 16 of the fitting 10 around the contacts 24 and 26.

As will be understood by those skilled in the art, the saddle tee fitting 10 is fusion welded to the pipe 12 by applying an electric current to the heating element 22 whereby the thermoplastic material of the fitting 10 and the pipe 12 adjacent the heating element 22 are caused to be fused together. Electric current is applied to the heating element 22 by attaching lead wires or cables connected to a power source to the terminals 24 and 26. Once the fusion welding of the fitting 10 to the pipe 12 has been accomplished, a circular opening 18 is formed in the pipe 12 which communicates with the interior of the pipe stub 14. The opening 18 is easily formed by extending a drilling or cutting tool through the interior of the pipe stub 14 into contact with the pipe 12.

Referring now to FIGS. 6 and 7, the heating element 22 is illustrated in detail prior to when it is molded into the fitting 10 in a manner to be described hereinbelow. Further, as mentioned above, the heating element 22 can be utilized apart from the fitting 10 in other applications wherein thermoplastic materials are fused together, e.g., the repair of thermoplastic materials utilized as protective coverings. When used in such other applications, the heating element 22 is substantially in the form shown in FIGS. 6 and 7.

The heating element 22 is comprised of an elongated thermoplastic insulated wire 11 having a portion thereof wound in a substantially planar spiral configuration 21 and having adjacent surfaces of the thermoplastic insulation of the wire 11 in the spirally configured portion 21 adhered together. The substantially planar spirally configured portion 21 is annular in shape and includes a central opening 23 therein. Opposite end portions 28 and 30 of the wire 11 extend from the spirally configured portion 21 and the ends of the wire 11 are connected to electric contacts 24 and 26. A bridge 36 formed of thermoplastic material fused to the spirally configured portion 21 and to the end portion 30 of the wire 11 can optionally be utilized. The use of the bridge 36 prevents the end portion 30 of the wire 11 which connects to the interior of the spirally configured portion 21 from sagging into and shorting against the portion 21 when electric current is applied to the heating element 22 and melting of the thermoplastic insulation takes place. As will be understood, the use of the contacts 24 and 26 is for convenience in attaching electric power source leads to the heating element 22, and such contacts can be omitted without affecting the operation of the heating element 22.

When the heating element 22 is utilized in a thermoplastic saddle tee fitting 10, the element 22 is placed in a mold for forming the fitting 10. That is, the element 22 is placed against and conformed to the curvature of the surface of the mold corresponding to the inside surface 15 of the fitting 10 to be formed therein. The contacts 24 and 26 are positioned within the mold, and molten thermoplastic material is introduced therein to form a fitting 10 having the heating element 22 molded therein.

Upon being molded into the fitting 10, the lower surface of the spirally configured portion 21 of the heating element 22 forms a portion of the surface 15 of the fitting 10. When the fitting 10 is positioned on the pipe 12 preparatory to fusing as shown in FIGS. 3 and 4, the heating wire of the element 22 is removed from the exterior surface 17 of the pipe 12 by only the thickness of the thermoplastic insulation covering the wire. This is contrasted with a fitting containing a prior art heating element comprised of a thermoplastic plate having a spiral groove formed therein with the heating wire disposed in the groove which generally includes a much thicker layer of thermoplastic material between the wire and the adjacent pipe surface. The lesser thickness of thermoplastic material between the heating wire and pipe surface brought about by the fitting of the present invention causes a better fusion between the thermoplastic materials of the fitting and pipe to take place.

Referring now to FIGS. 8 through 10, one form of apparatus for carrying out the method of the present invention to produce the heating element 22 is illustrated and generally designated by the numeral 40. The apparatus 40 is comprised of a rotatable shaft 42 having an enlarged cylindrical member 44 attached thereto. A hollow spindle 46 is attached to the side of the enlarged cylindrical member 44 opposite the shaft 42. The spindle 46 is positioned coaxially with the shaft 42, and includes a longitudinal slot 48 formed in a side thereof. A second cylindrical member 50 corresponding in size and shape to the cylindrical member 44 is slidably disposed on the spindle 46 (FIG. 8).

In operation of the apparatus 40 to produce a heating element in accordance with the method of the present invention and as shown in FIG. 8, one end of an elongated thermoplastic insulated wire 60 is passed through the slot 48 in the spindle 46 and through the interior of the spindle 46 to a position beyond the exterior end thereof. The cylindrical member 50 is positioned on the spindle 46 adjacent the cylindrical member 44 and the wire 60 is tightly wound in a spiral configuration between the members 44 and 50 by rotating the shaft 42. An end portion of the wire 60 is left extending from the spirally configured portion to the exterior of the apparatus 40. While maintaining the wire 60 tightly wound on the apparatus 40, electric leads 62 and 64 are attached to insulation stripped ends 66 and 68 of the wire 60. The leads 62 and 64 are connected to a source of electric current, and the thermoplastic insulation of the wire 60 is briefly heated by applying an electric current to the wire 60. The wire 60 is heated to a temperature level such that adjacent surfaces of the thermoplastic insulation in the spirally configured portion of the wire 60 are fused together. The leads 62 and 64 are then removed from the wire 60, the cylindrical member 50 is removed from the spindle 46 and the fused wire 60 is removed from the spindle 46 (FIG. 9).

As illustrated in FIUGRE 10, the heating element produced from the wire 60 is comprised of a fused substantially planar spirally configured portion 70 corresponding to the portion 21 of the heating element 22, a wire end portion 72 extending from the spirally configured portion 70 which corresponds to the end portion 28 of the heating element 22 and an end portion 74 extending from the spirally configured portion 70 which corresponds to the end portion 30 of the heating element 22. To complete the heating element in the form of the heating element 22, a bridge corresponding to the bridge 36 and contacts corresponding to the contacts 24 and 26 can be attached thereto.

As will be understood by those skilled in the art, the heating of the thermoplastic insulation of the wire 60 can be accomplished in ways other than by applying an electric current to the wire 60 as described above. For example, one or both of the cylindrical members 44 and 50 can be heated to in turn heat the thermoplastic insulation and cause the fusion thereof. As will be further understood, a variety of other apparatus equivalent to the apparatus 40 can be developed for producing heating elements of this invention.

Thus, the present invention is well adapted to carry out the objects and attain the ends and advantages mentioned as well as those inherent therein. While numerous changes in the construction and arrangement of parts will suggest themselves to those skilled in the art, such changes are encompassed within the spirit of this invention as defined by the appended claims.

What is claimed is:

1. An electric heating element for electrically fusing thermoplastic materials positioned adjacent thereto comprising an elongated thermoplastic insulated wire having a portion thereof wound in a substantially planar spiral configuration and having adjacent surfaces of said thermoplastic insulation of said wire in said spirally configured portion adhered together.

2. The electric heating element of claim 1 wherein said spirally configured portion of said heating element has a central opening therein.

3. The electric heating element of claim 2 wherein opposite end portions of said wire extend from said spirally configured portion.

4. The electric heating element of claim 3 wherein the ends of said wire are connected to electric contacts.

5. In a thermoplastic fitting adapted to be fusion welded to a complementary thermoplastic member and having as a part thereof an electric spirally wound wire heating element, the improvement comprising:

said spirally wound wire heating element being comprised of an elongated thermoplastic insulated wire having at least a portion thereof wound in a substantially planar spiral configuration and having adjacent surfaces of the thermoplastic insulation of said wire in said spirally configured portion adhered together.

6. The thermoplastic fitting of claim 5 wherein said spirally configured portion of said heating element has a central opening therein.

7. The thermoplastic fitting of claim 6 wherein said fitting includes a lateral opening therein and said spirally configured portion of said heating element is molded in said fitting around said opening.

8. The thermoplastic fitting of claim 7 wherein said fitting is a saddle tee.

9. The thermoplastic fitting of claim 7 wherein said heating element includes opposite end portions of said wire extending from said spirally configured portion.

10. The thermoplastic fitting of claim 9 wherein the ends of said wire of said heating element are connected to electric contacts attached to said fitting.

11. A method of producing an electric heating element for electrically fusing thermoplastic materials positioned adjacent thereto comprising:

winding a portion of an elongated thermoplastic insulated wire in a substatially planar spiral configuration; and briefly heating said thermoplastic insulation of said wire while maintaining said wire in said spiral configuration whereby adjacent surfaces of said thermoplastic insulation in the spirally configured portion of said wire are fused together.

12. The method of claim 11 wherein said spirally configured portion of said wire is wound such that a central opening is included therein.

13. The method of claim 12 wherein opposite end portions of said wire extend from said spirally configured portion.

14. The method of claim 13 which is further characterized to include the step of attaching electric contacts to the ends of said wire.

15. The method of claim 11 wherein the step of briefly heating said thermoplastic insulation of said wire comprises briefly applying an electric current to said wire whereby said wire is heated sufficiently to cause adjacent surfaces of said thermoplastic insulation in the spirally configured portion of said wire to be fused together.

* * * * *